Oct. 13, 1936.                J. C. BERGNER                 2,057,639
                      DOUGHNUT MACHINE AND THE LIKE
                         Filed March 5, 1935          6 Sheets-Sheet 1
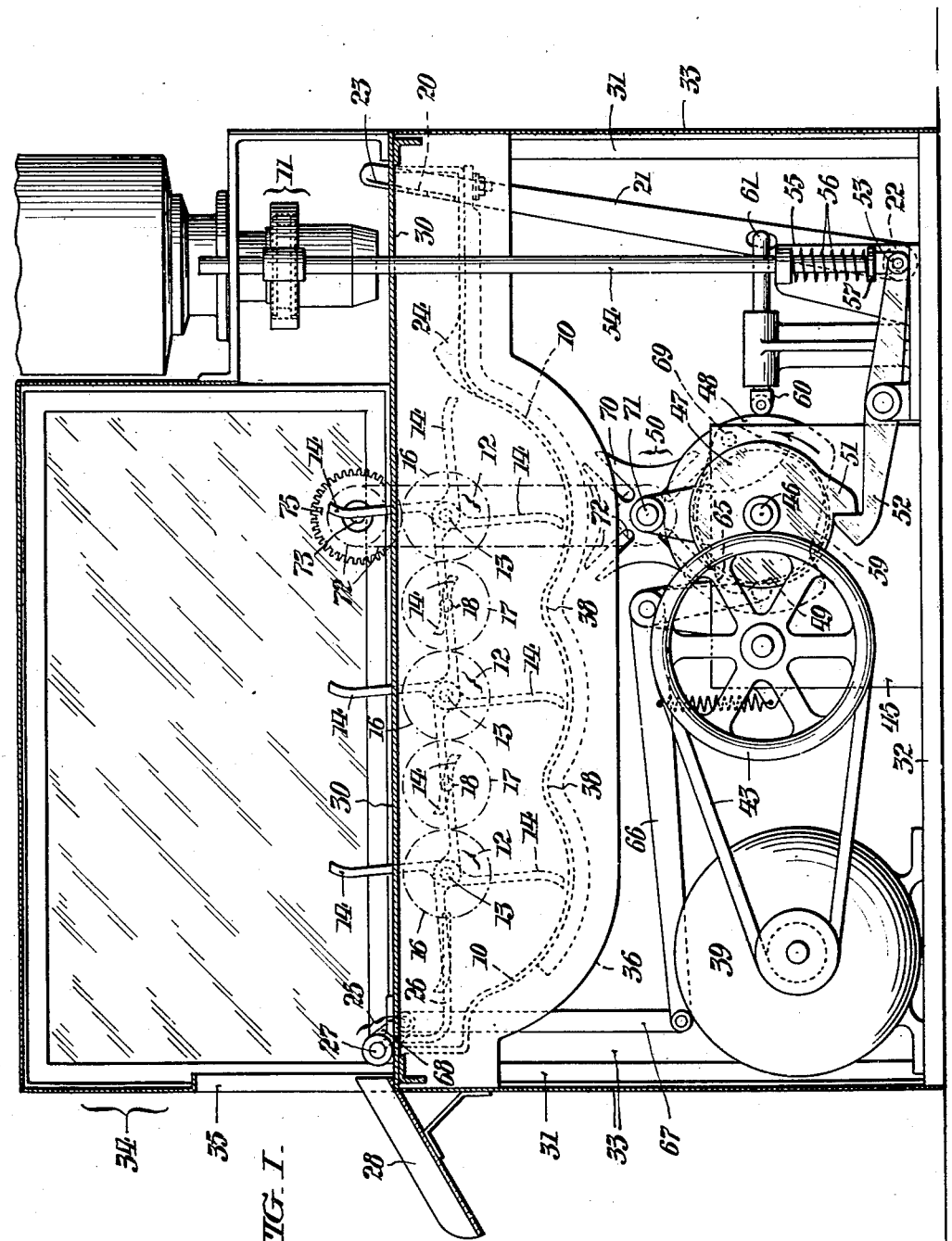
FIG. I.
WITNESSES:                                              INVENTOR:
                                                    John C. Bergner,
                                                BY
                                                          ATTORNEYS.

Oct. 13, 1936.  J. C. BERGNER  2,057,639
DOUGHNUT MACHINE AND THE LIKE
Filed March 5, 1935  6 Sheets-Sheet 2
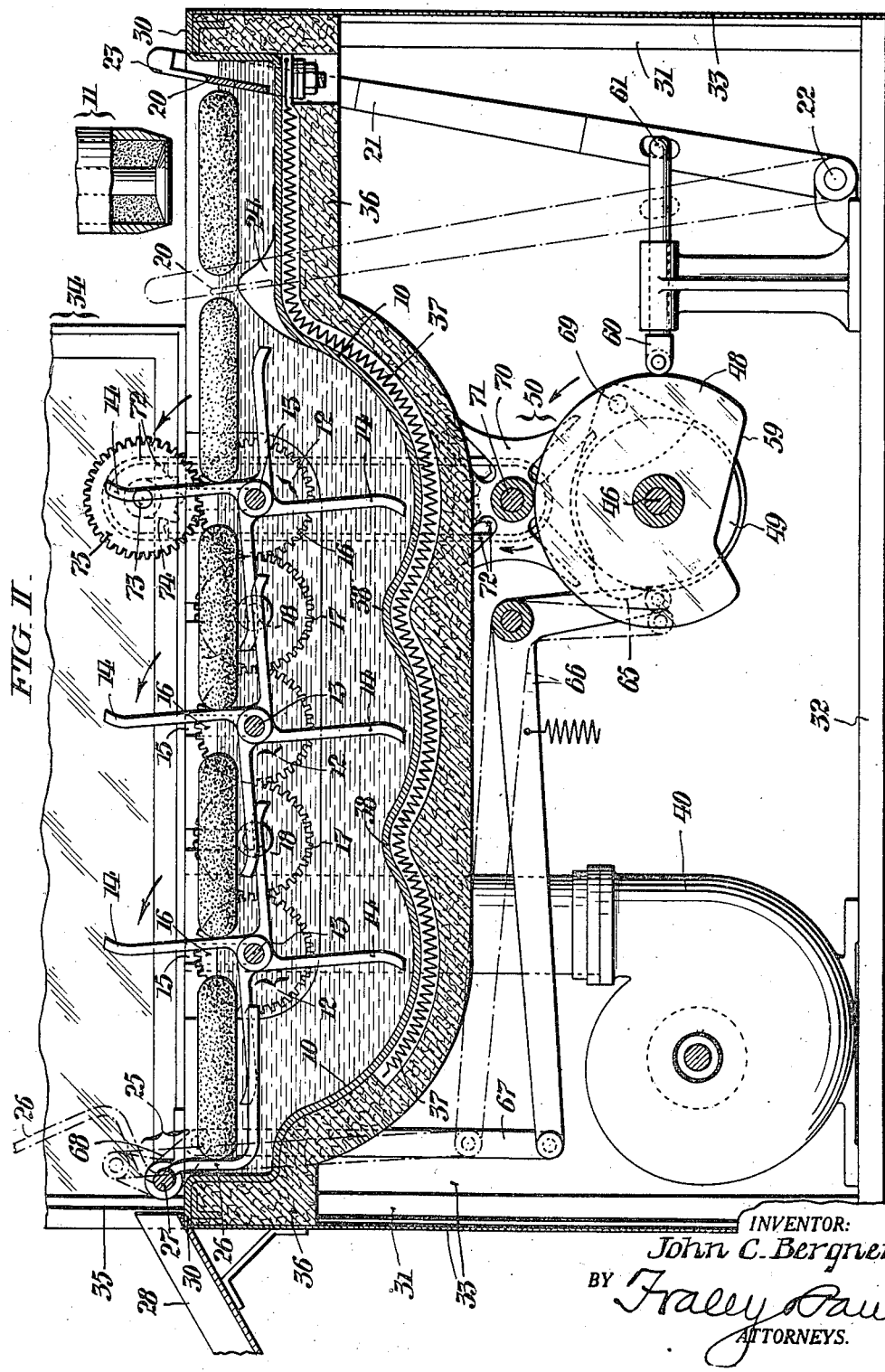
INVENTOR:
John C. Bergner,
BY Fraley Paul
ATTORNEYS.

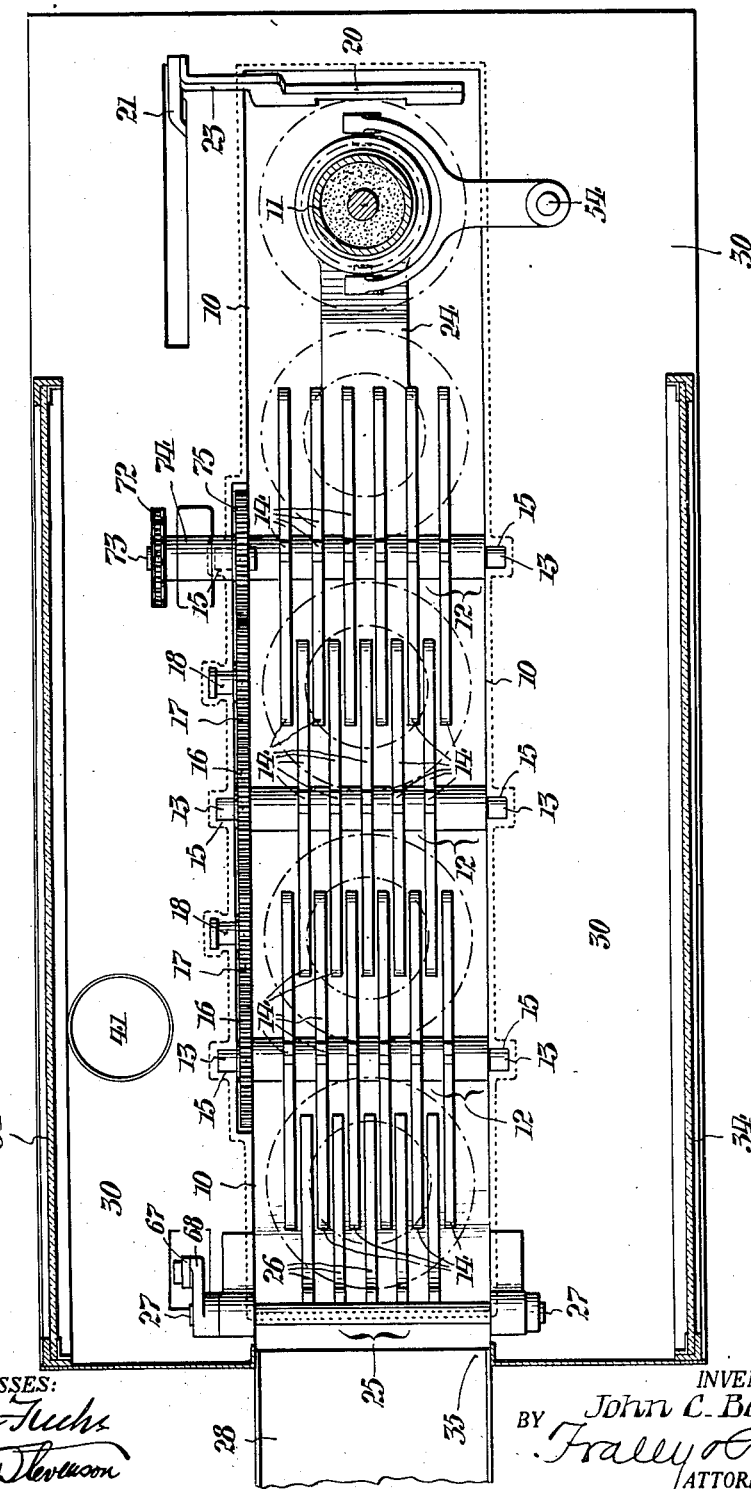

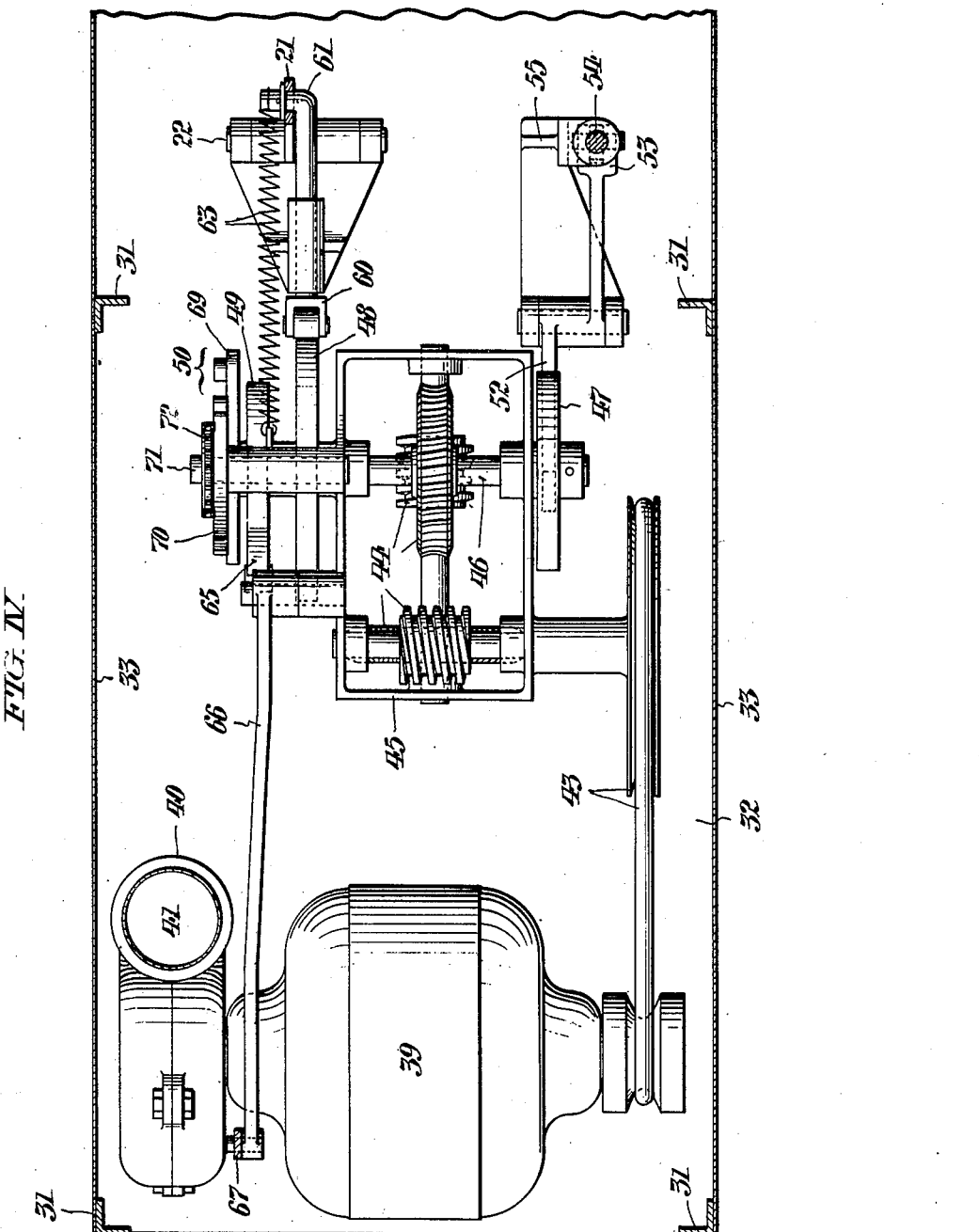

Oct. 13, 1936.　　　　J. C. BERGNER　　　　2,057,639
DOUGHNUT MACHINE AND THE LIKE
Filed March 5, 1935　　　6 Sheets-Sheet 5
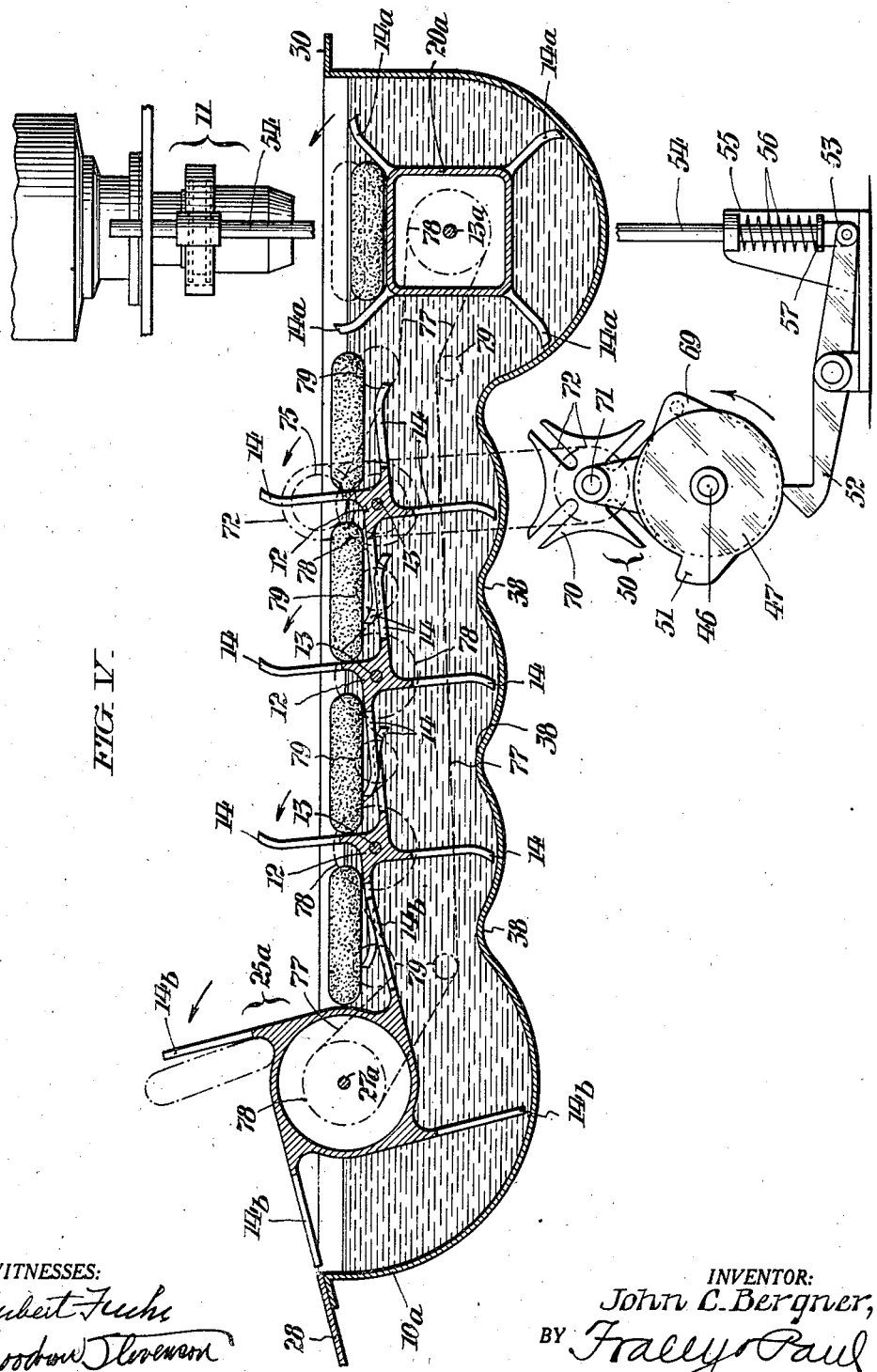

Oct. 13, 1936.   J. C. BERGNER   2,057,639
DOUGHNUT MACHINE AND THE LIKE
Filed March 5, 1935   6 Sheets-Sheet 6
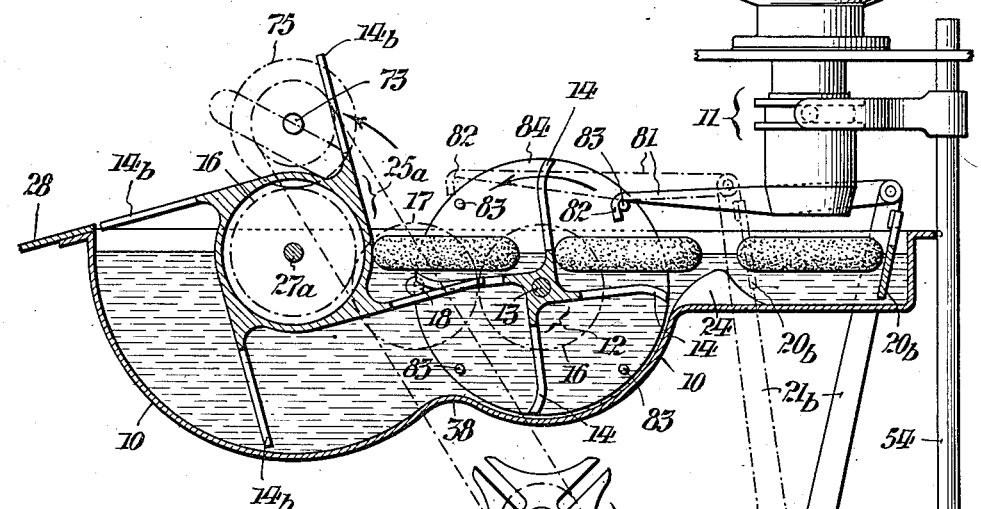
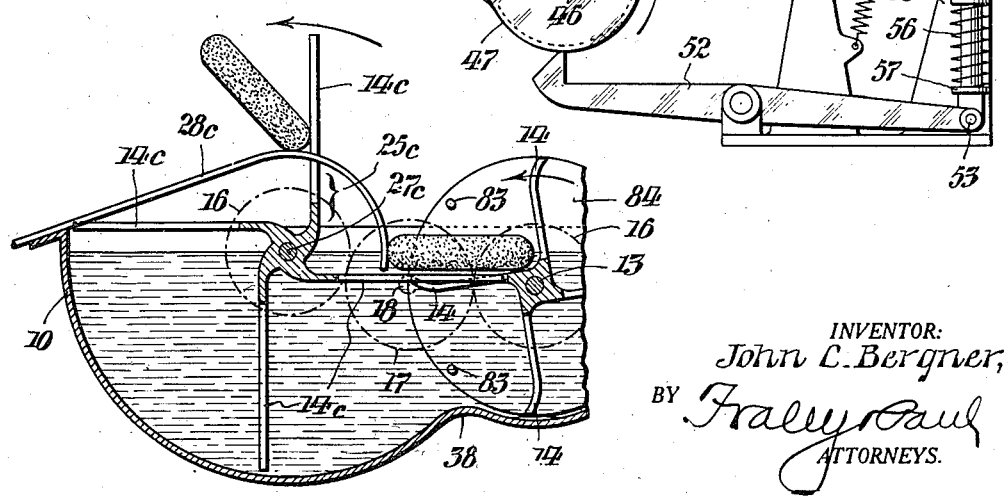
INVENTOR:
John C. Bergner,
BY Fraley Paul
ATTORNEYS.

Patented Oct. 13, 1936

2,057,639

UNITED STATES PATENT OFFICE 2,057,639

DOUGHNUT MACHINE AND THE LIKE

John C. Bergner, Lansdowne, Pa., assignor to Doughnut Corporation of America, New York, N. Y., a corporation of New York Application March 5, 1935, Serial No. 9,441

15 Claims. (Cl. 53—7)

This invention relates to the production of doughnuts and the like, and to novel machinery for this purpose that is especially adaptable and advantageous for producing doughnuts on a small scale. In suitable forms of embodiment, such as here shown and described, the invention affords a simple, compact, automatic machine, well adapted for display on store counters or in shop windows, requiring but a relatively small amount of cooking "liquor" or grease, and using such small amounts of power as to be economically operable by current from the usual 110 volt lighting circuit, and even from an ordinary electric lamp socket. Such a machine is comparatively foolproof, and will operate continuously (with very little supervision) to turn out uniformly cooked doughnuts, evenly browned all over. Other features and advantages of the invention will appear from the following description of species thereof, and from the drawings, whence it will also appear that some of the features and combinations described are of more general utility, in doughnut machines of various types, and even in the quantity production of doughnuts.

In the drawings, Fig. I affords a side view of a machine conveniently embodying my invention, with one side of its casing or enclosing structure removed.

Fig. II is a fragmentary longitudinal sectional view on a larger scale than Fig. I.

Fig. III is a plan view, with the upper casing or cooking enclosure in horizontal section.

Fig. IV is a fragmentary plan view of the parts below the cooking receptacle, with the lower machinery enclosure in horizontal section.

Fig. V is a view similar to Fig. II, illustrating another form of machine embodying the invention.

Fig. VI is a view similar to Figs. II and V, illustrating yet another form of machine.

Fig. VII is a fragmentary view similar to Fig. VI, illustrating a different ejector arrangement for the discharge of cooked doughnuts.

An important feature of the types of doughnut machine here shown is that most or all of the principal operations incident to travel of doughnuts through the apparatus are effected by movement of the doughnuts in their general direction of travel, and preferably by the engagement means whereby the doughnuts are fed along. The machine shown in Figs. I, II, III, and IV has a vessel or receptacle 10 for the cooking liquor or grease employed, affording a straight cooking range or channel about one doughnut wide. Raw doughnut formations are deposited horizontal in the cooking liquor in one end of the receptacle 10 by any suitable means, such as a forming device 11 close over the liquor, and are then fed along through the receptacle and ejected from the liquor at its other end. In the course of their travel, the doughnuts are thrown over forward, to cause them to cook alike on both sides, as well as to advance them correspondingly.

As a principal means for feeding the doughnuts along and turning them over, Figs. I, II, and III show a series of (three) revolving "paddle-vane" devices or spiders 12, arranged to turn or revolve in the same direction (in an upright or vertical plane) about axes or shafts 13 that extend transversely of the receptacle 10 and of the course of travel of the doughnuts afforded thereby. As best shown in Fig. III, the paddle or vane members of each spider 12 are of grid-like construction, consisting of rows or sets of arms or "spokes" 14 radiating from a common hub fast on the shaft 13. As shown, the ends of these spokes 14 are bent or curled rearward, away from their direction of movement. The spokes 14 at adjacent sides of adjacent spiders 12 are arranged to interlap as they revolve, as shown in Figs. II and III; or, to put it somewhat differently, these spokes of adjacent spiders are intercurrent. In the positions of the spiders 12 shown in Fig. II, spokes 14 of each spider extend to opposite sides of its axis 13, below the surface of the liquor and in approximately the same relation (angle and depth) with reference thereto, while other spokes 14 project almost vertically upward from the axis 13. Thus separate cooking "cells" are formed between adjacent spiders 12, as well as at the front of the first spider (at the right of Fig. II) and at the rear of the last spider (at the left of Fig. II). In this particular instance, each spider 12 has four "paddle vanes" or sets of spokes 14; but obviously the number of sets of spokes to a spider might be somewhat greater or less. As shown in Fig. III, the ends of the spider shafts 13 engage and revolve in open topped bearing recesses 15 formed in the side walls of the receptacle 10, and the spiders are interconnected and geared together to turn in the same direction by toothed gears 16 fast on the shaft 13 and interposed idler gears 17 revolving on stub shafts 18 suitably mounted in the side of the receptacle. The gears 16 and 17 revolve in the cooking grease and are lubricated by it.

From the foregoing description and from Fig.

II, it will be seen that a fraction of a revolution of each spider 12 corresponding to its number of vanes—i. e., one-fourth of a complete revolution of the four-vane spiders shown—will throw and turn over (invert) the doughnut shown at the front (right) of the first spider into the space or cell between the first and second spiders; and will at the same time throw and turn over the doughnut there shown into the space or cell between the second and third spiders; and will throw and turn over the doughnut there shown into the space or cell at the rear (left) of the third spider.

To avoid interference of the doughnut dropping device 11 with the spokes 14, the doughnuts may not be dropped at a point directly over the right hand spokes of the first (right-hand) spider 12, but rather to one side of such point, and preferably in the general line of the series of spiders 12, as shown in Figs. II and III. Provision is accordingly made for impelling or shifting the dropped doughnuts to one side from under the dropping means 11, over the front spokes 14 of the first spider 12, or into the path of their upward movement. The shifting means shown in Figs. II and III comprises a pusher 20 movable to and fro in the doughnut-receiving end of the receptacle 10, toward the first spider 12 and back again. As shown, this reciprocating or oscillating pusher 20 is carried by an oscillatory arm 21 fulcrumed on a transverse axis 22 below the vessel 10 and extending up above the edge of the latter, where an angle shank 23 extending up from the pusher 20 and over the edge of the receptacle is attached to the upper end of the rock arm 21. The to and fro movement of the pusher 20 occurs after the right-hand spokes 14 of the first spider 12 have moved upward somewhat from their position shown in Fig. II.

As shown in Figs. I, II and III, there is an upstanding "hill"-like projection 24 on the bottom of the receptacle 10, between the space or cell under the former 11 and that at the front of the first spider 12. This part 24 serves as a barrier between doughnuts in the two positions, preventing a doughnut under the former 11 from "drifting" to the left into the path of the upward moving spokes 14, and preventing a doughnut at the front of the first spider 12 from drifting or being kicked to the right, out of proper position for engagement by the spokes 14. Normally, the doughnut dropped from the device 11 has cooked enough to float on the liquor as shown when the movement of pusher 20 to its dotted left-hand position (Fig. II) occurs; and in case this doughnut should not yet be buoyant when thus shifted, the right-hand slope of the projection 24 will lift the advancing doughnut above the ends of the right-hand spokes 14.

From the space or cell at the rear (left-hand) of the last spider 12, the fully cooked doughnuts may be ejected or thrown over the discharge end of the receptacle 10 by an ejector 25, shown as of an oscillatory type and of grid construction resembling that of a vane of one of the spiders 12. This ejector 25 comprises L-bent arms or spokes 26 which are attached to a transverse shaft or axis 27 in bearings above the receptacle 10, and extend down into the liquor and then horizontally, interlapping with the spokes 14 of the last spider 12. When the ejector 25 is swung up to its dotted position in Fig. II, the fully cooked doughnut above it is thrown up and over the end wall of the receptacle 10 into the sloping delivery chute 28, being incidentally inverted at the same time.

As shown in Figs. I–IV, the receptacle 10 is surrounded by an attached horizontal apron 30 and is supported by a frame of angle bar uprights 31 upstanding from the corners of a base 32. The space under the receptacle 10 is enclosed by sheet metal panels 33 attached to the frame 31 and the edges of the apron 30, and this closed compartment contains the driving mechanism for the operating parts above described. Over the receptacle 10 is shown a glazed cooking enclosure or hood 34 with a portion of reduced height at one end having a top opening in which the forming device 11 is mounted. At the other end of the enclosure 34 is a discharge opening 35 for the chute 28.

As shown in Fig. II, the receptacle 10 is covered with heat insulation 36, and has electrical heating resistance means 37 on its bottom, enclosed in the insulation 36. At its right-hand end where the raw dough formations are deposited by the device 11, the receptacle 10 is shallow, though deep enough for total initial immersion of the dropped doughnuts. Where the revolving spiders 12 are located, the vessel 10 is deeper, and has transverse corrugations or depressions concentric with the spider axes 13, separated by rounded ridges 38.

The driving mechanism in the enclosed compartment beneath the vessel 10 includes an (electric) motor 39 which directly drives a (centrifugal) exhauster 40 whose intake 41 extends and opens up through the apron 30 to exhaust cooking fumes from the enclosure 34. Through speed reducing connections including a belt drive 43 and a double worm gearing 44 (in the gear box 45), the motor 39 drives a transverse shaft 46 from which the motions of all the operating parts are derived. The former 11, the pusher 20, and the ejector 25 are actuated by cams 47, 48, 49 fast on the shaft 46. In the present instance, the movement of the spiders 12 is a quarter turn step-by-step motion, and they are driven from the shaft 36 by any suitable intermittent gearing, here shown as a quarter-turn Geneva movement 50. Of course, toothed intermittent gearing might be used for this purpose, if preferred.

The former-cam 47 (Fig. I) is circular with a single projection 51 that acts on one arm of a rocking lever 52 whose other arm has a slot and pivot connection 53 to a vertical rod 54 extending up through a guide bracket 55 and the apron 30 to the former 11, shown (Fig. II) of a well-known sleeve and disc type. The cam projection 51 opens the former-die-outlet quickly for a short time and allows it to snap shut suddenly, by gravity and the action of a helical compression spring 56 around the rod 54, acting between bracket 55 and a shoulder 57 on the rod. The pusher-cam 48 (Fig. II) is circular with a reduced segment or recess 59 somewhat less than 90° in total extent; it acts on the pusher arm 21 through a roller on a sliding follower rod 60 having a laterally bent projection 61 engaged in a slot in the arm 21; and a helical tension spring 63 urges the lever 21 to the left. The cam recess 59 allows the pusher 20 to move gradually to the left to the dotted position shown, and then returns it gradually to full-line position. The ejector-cam 49 (Fig. II) is circular with a single projection 65 that acts on a roller on one arm of a bell-crank lever 66 whose other arm is connected by a link rod 67 to a crank arm 68 fast to the end of the ejector shaft 27. The cam 49 swings the ejector 25 quickly upward and to the left to the dotted position of Fig. II, and allows it to return quickly to full-line position.

The Geneva movement 50 includes a driving and locking member 69 fast on the shaft 46, and a driven and locked slotted and arcuately hollowed member or star wheel 70 on a countershaft 71. From the driven member 70, the train of revolving spiders 12 are driven by connections including a sprocket and chain drive 72 to a short shaft 73 (mounted in a bearing bracket 74 upstanding from the apron 30) and a toothed pinion 75 fast to the shaft 73 and meshing with one of the gears of the spider train 16, 17 above described.

With the various cams 47, 48, 49 and the members of the Geneva movement 50 designed and relatively set as above described, the spiders 12 make a quarter turn for each revolution of shaft 46 with the cams and the driving member 69. This movement of the spiders occupies about one-fourth of the time of revolution of shaft 46, so that the spiders are stationary three-fourths of the time. Starting from the positions of the parts shown in Fig. II, the ejector 25 is first operated by cam 49 to eject the last (fully cooked) doughnut at the left of the last spider 12, cam 47 having previously opened and closed the forming die outlet at 11 to drop the doughnut shown in Fig. II under the former 11. About as the ejector 25 returns to horizontal, the pin of the Geneva driver 69 starts to enter the slot of the driven member 70 and turn the spiders 12; and soon after this, the recess 59 of cam 48 reaches the roller of follower 60 and initiates the movement of pusher 20 to the left. Thus the doughnut shown under the former 11 in Fig. II is pushed in under the right-hand spoke 14 of the first spider 12, as it is moving upward from its position in Fig. II, into the path of the next spoke 14, shown in Fig. II as directed downward. After cam 48 has allowed pusher 20 to return to its full-line right-hand position in Figs. I and II, and after the pin of the Geneva driver 69 has left the slot of the driven member 70, cam 47 quickly opens and closes the forming die outlet at 11, thus dropping another raw doughnut in front of the pusher 20, as shown in Fig. II. All the parts now remain at rest in the positions shown in Fig. II for about two-thirds of a revolution of shaft 46; and thereupon a repetition of the cycle just described ensues.

The machine shown in Fig. V differs from that of Figs. I–IV in the employment of rotary doughnut manipulating devices throughout, and in certain features of the drive.

For impelling or advancing the raw doughnuts from under the former 11 to the first of the rotary spiders 12, there is a rotary paddle wheel or spider-like device 20a that is shown practically submerged in the liquor under the dropping device 11, and turns with the spiders 12, but preferably has its vanes 14a displaced about 45° from the directions of their vane spokes 14,—so that when the spokes 14 are about horizontal and vertical as shown, the spokes 14a point up and down at about a 45° slant. Preferably, the tips of the vanes 14a are curled rearward (relative to their direction of rotation) somewhat like those of the vanes 14, to enable them to slide past the doughnuts more easily. The vanes 14a need not necessarily interlap with the vanes 14 of the first spider 12, and need not necessarily be of spoked gridlike construction, as here shown. The spider 20a may have a polygonal hub (in this instance square) from whose angles the vanes 14a radiate.

Thus the flat hub sides form horizontal flat bottoms for the pockets or cells between the vanes, which will not deform the initially dropped doughnuts when they sink in the liquor. As shown, the transverse axis 13a of the spider 20a is lower in the receptacle than the spider axes 13, and the receptacle bottom has a deep rounded pocket to accommodate the spider 20a.

The ejector 25a is shown in Fig. V as a rotary paddle wheel or spider-like device that turns with spiders 12. Its vanes 14b are of spoked grid construction, to permit their intercurrence and interlap with the vanes 14 of the last spider 12. This spider 25a has a large rounded hub with the spoked vanes 14b extending tangentially from it. Its axis 27a is mounted higher than the spider axes 13,—about at or slightly above the surface of the liquor,—so that while (in the positions of the parts here shown) the spokes 14b to the right lie in the liquor and interlap with the spokes 14 of the last spider 12, the spokes 14b to the left lie well above the liquor and above the edge of the receptacle 10a,—forming, in fact, an inward and upward prolongation of the delivery chute 28.

As shown in Fig. V, the spiders 20a, 12, 12, 12, and 25a are intergeared to turn together by means of an interconnecting sprocket chain 77 passing over or around sprockets 78 of the same size fixed on all the shafts 13a, 13, 13, 13, and 27a, and also guided by idle sprocket wheels 79, some of which prevent rubbing of the chain 77, while others increase its arc of contact with the sprockets 78. The rest of the drive is like that shown in Figs. I, II, and IV,—minus the cams 48 and 49 and the associated parts, of course.

The operation is generally similar to that of the machine of Figs. I–IV. The vanes 14a push the floating doughnuts to the left over or into the path of the rising spokes 14 of the first spider 12,—without, however, inverting the doughnuts. The spiders 12, 12, 12 operate as in Figs. I–IV. At each quarter turn of spider 25a, one of its vanes 14b rises from under the liquor and swings past the vertical to the position shown in Fig. V, and tips and throws the fully cooked doughnut thereon over and down the incline formed by the preceding vane 14b and by the chute 28.

The machine shown in Fig. VI differs from those of Figs. I–V in having only two revolving spiders 12 and 25a, the latter somewhat larger than the former and acting as the ejector. For impelling or advancing the dropped doughnuts from under the former 11 to the revolving spider 12, there is a pusher 20b that is mounted on an arm 21b fulcrumed at 22b beneath the receptacle 10, and is urged to the right to its full-line position by a tension spring 80. This pusher 20b is drawn to the left to push the last dropped doughnut over into the path of the spider 12 by the revolution of the latter. For this purpose, there is a link rod 81 pivoted to the upper end of the pusher arm 21b and provided with a hook 82 at its free end. The hook 82 is adapted to engage lugs or pins 83 on a disk 84 at one side of the spider 12, so that as this spider throws one doughnut over to the spider 12b, it pulls another doughnut over into position to be acted on by spider 12 on the next movement of the latter. As this movement of pusher 20b to the left carries it to the dot-and-dash position shown in Fig. VI, the hook 82 is lifted off the pin 83 which has been pulling the pusher by the succeeding pin 83; whereupon spring 80 returns pusher 20b to its full-line right-hand position. Any suitable dashpot or other means (not shown) may be employed to damp this movement of the pusher 20b, so that it shall not slop the liquor over the end of the receptacle 10, or splash or agitate it unduly. The ejector spider 25a operates like that in Fig. V. The spiders 12 and 25a are interconnected and driven substantially like the spiders in Figs. I–III, except that the sprocket chain and gear drive 72, 73, 75 is connected to the shaft 27a of spider 25a, instead of to the shaft 13 of spider 12.

Fig. VII illustrates an ejector somewhat different from those of Figs. V and VI: it is shown applied to a machine like that of Fig. VI, although it is equally applicable to other types of machine. The ejector spider 25c resembles the spider 12 in general design, although its vane spokes 14c are longer. With the spider 25c is associated a guide and discharge chute device 28c, comprising sloping bars or rods arranged and interlapping between the spokes 14c, and having their inner ends curved around the spider axis 27c concentrically therewith. The ends of these bars or rods 28c dip into the cooking liquor so as to cooperate with the upright vane of spider 12 in forming a cell for confining the doughnuts. When the ejector spokes 14c that are shown horizontal in the liquor swing upward, the doughnut overlying these spokes (as in Fig. VII) travels and rests against the bars 28c till the spokes come upright, and then the doughnut tumbles over (by its momentum) and slides down the sloping bars at 28c over the edge of the receptacle 10. Thus the device 28c cooperates with the spider 25c in the ejection of the cooked doughnuts.

In Figs. V, VI and VII, various parts and features are marked with the same reference characters as their analogues in Figs. I–IV, as a means of dispensing with repetitive description,—with the addition of a distinctive letter where distinction appears desirable.

Having thus described my invention, I claim:

1. In a doughnut machine, the combination with a receptacle for hot cooking liquor affording a range or course for the travel of doughnuts in the liquor, and means for dropping raw doughnuts horizontal into the liquor at the receiving end of said receptacle and course, of means for throwing the doughnuts over and over continuously along said course, and thereby feeding them along and finally ejecting them from the receptacle, besides causing them to cook substantially alike on both sides.

2. In a doughnut machine, the combination with a receptacle for hot cooking liquor affording a range or course for the travel of doughnuts in the liquor, and means for dropping raw doughnuts horizontal into the liquor at the receiving end of said receptacle and course, of means for conveying the dropped doughnuts along said course and finally ejecting them from the receptacle, including a series of adjacent, directly intercoacting doughnut-handling grids, and means for turning them upward in the direction of said course, thus throwing the doughnuts over and forward from grid to grid along the course.

3. In a doughnut machine, the combination with a receptacle for hot cooking liquor affording a range or course for the travel of doughnuts in the liquor, and means for dropping raw doughnuts horizontal into the liquor at the receiving end of said receptacle and course, of means for conveying the dropped doughnuts along said course, and finally ejecting them from the receptacle, comprising a series of revolving spiders with spokes at their adjacent sides intercurrent, and interlapping in the liquor at each revolution, so that as the spiders revolve they successively receive and throw over the doughnuts, thereby conveying them along said course with substantially like cooking on both sides.

4. In a doughnut machine, the combination with a receptacle for hot cooking liquor affording a range or course for the travel of doughnuts in the liquor, and means for dropping raw doughnuts horizontal into the liquor at the receiving end of said receptacle and course, of means for impelling the dropped doughnuts to one side from under the dropping means; a series of revolving spiders with spokes at their adjacent sides intercurrent, and interlapping in the liquor at each revolution, so that as the spiders revolve they successively receive and throw over the doughnuts, thereby feeding them along said course with substantially like cooking on both sides; and means for ejecting the doughnuts from the exit end of said receptacle and course.

5. In a doughnut machine, the combination with a receptacle for hot cooking liquor affording a range or course for the travel of doughnuts in the liquor, and means for dropping raw doughnuts horizontal into the liquor at the receiving end of said receptacle and course, of a series of revolving spiders with spokes at their adjacent sides intercurrent, and interlapping in the liquor at each revolution, so that as the spiders revolve they successively receive and throw over the doughnuts, thereby feeding them along said course with substantially like cooking on both sides; means cooperating with the first spider to impel the dropped doughnuts from under said dropping means to one side into position over the rising spokes of said spider; and means cooperating with the last spider to eject the cooked doughnuts from the exit end of the receptacle.

6. In a doughnut machine, the combination with a receptacle for hot cooking liquor affording a range or course for the travel of doughnuts in the liquor, and means for dropping raw doughnuts horizontal into the liquor at the receiving end of said receptacle and course, of means for conveying the dropped doughnuts along said course, and finally ejecting them from the receptacle, comprising a series of rotary spiders with their axes or shafts extending across said vessel and course, and with spokes at their adjacent sides intercurrent and interlapping in the liquor; toothed gears on the spider shafts and idler gears interconnecting them, so that the spiders revolve in unison in the same direction; and means for driving the train of spiders with their gears in definite relation to the dropping of doughnuts as aforesaid.

7. In a doughnut machine, the combination with a receptacle for hot cooking liquor affording a range or course for the travel of doughnuts in the liquor, and means for dropping raw doughnuts horizontal into the liquor at the receiving end of said receptacle and course, of means for conveying the dropped doughnuts along said course, and finally ejecting them from the receptacle, comprising a series of rotary spiders with their axes or shafts extending across said vessel and course; gearing interconnecting the spiders to revolve in unison in the same direction, with spokes at their adjacent sides intercurrent and interlapping in the liquor; means for impelling the dropped doughnuts to one side from under the dropping means, into the upward path of the adjacent spokes of the first spider; ejector means having spokes intercurrent and interlapping with those of the last of the aforesaid spiders; and driving means for said doughnut-dropping and conveying and ejector means, including intermittent gearing for periodically revolving the spiders and allowing them to dwell with their interlapping spokes under the liquor, and means for operating said impelling and ejector means substantially during the dwell of said spiders.

8. In a doughnut machine, the combination with a receptacle for hot cooking liquor affording a range or course for the travel of doughnuts in the liquor, and means for dropping raw doughnuts horizontal into the liquor at the receiving end of said receptacle and course, of a revolving vaned spider or paddle wheel device adjacent said dropping means for throwing over and thus feeding along the doughnuts, and a reciprocating pusher operative in front of the spider axis to push the dropped doughnuts to one side from under the dropping means beyond the range of said reciprocating pusher into that of the spider vanes.

9. In a doughnut machine, the combination with a receptacle for hot cooking liquor of means located close above the cooking liquor for dropping raw doughnuts horizontal into the liquor, doughnut-manipulating means having a movement above the cooking liquor adjacent said dropping means, and a submerged revolving spider or paddle wheel device beneath said dropping means for shifting the dropped doughnuts to one side from under the dropping means into the range of said manipulating means.

10. In a doughnut machine, the combination with a receptacle for hot cooking liquor affording a range or course for the travel of doughnuts in the liquor, and means for dropping raw doughnuts horizontal into the liquor at the receiving end of said receptacle and course, of a revolving vaned spider or paddle wheel device adjacent said dropping means for throwing over and thus feeding along the doughnuts, and a submerged revolving spider or paddle wheel device beneath said dropping means for shifting the dropped doughnuts to one side from under the dropping means into the range of the spider vanes.

11. In a doughnut machine, the combination with a receptacle for hot cooking liquor affording a range or course for the travel of doughnuts in the liquor, and means for dropping raw doughnuts horizontal into the liquor at the receiving end of said receptacle and course, of a revolving vaned spider or paddle wheel device adjacent said dropping means for throwing over and thus feeding along the doughnuts, and means actuated by said revolving device for shifting the dropped doughnuts to one side from under the dropping means into the range of the spider vanes.

12. In a doughnut machine, the combination with a receptacle for hot cooking liquor affording a range or course for the travel of doughnuts in the liquor, and means for dropping raw doughnuts horizontal into the liquor at the receiving end of said receptacle and course, of a revolving vaned spider or paddle wheel device adjacent said dropping means for throwing over and thus feeding along the doughnuts, and a reciprocating pusher movable to and fro beneath said dropping means for shifting the dropped doughnuts to one side from under the dropping means into the range of the spider vanes.

13. In a doughnut machine, the combination with a receptacle for hot cooking liquor and means for feeding doughnuts along therein, of means for ejecting the doughnuts comprising a vaned spider or paddle wheel device revolving in an upright plane, and partly immersed in the liquor, so that doughnuts fed over the vanes at one side of the spider by said feeding means are lifted by the vanes rising beneath them and thrown over to the other side of the spider, with means for directing and delivering the thus thrown doughnuts over the edge of the receptacle.

14. In a doughnut machine, the combination with a receptacle for hot cooking liquor and means for feeding doughnuts along therein, of means for ejecting the doughnuts comprising a vaned spider or paddle wheel device revolving in an upright plane, and partly immersed in the liquor, and having its vanes arranged eccentric to its axis of rotation so that they may extend submerged in the liquor at one side of said axis, in position permitting doughnuts to be fed over them by said feeding means, and may extend to the other side of said axis on a downward slope, in position above the edge of the vessel, and may extend upward above said axis intermediate the aforesaid positions, so that the doughnuts are successively lifted by the upward movement of submerged vanes and ultimately thrown over on vanes in downward sloping position, which thus serve as discharge chutes delivering over the edge of the vessel.

15. In a doughnut machine, the combination with a receptacle for hot cooking liquor and means for feeding doughnuts along therein, of means for ejecting the doughnuts comprising a revolving spider with spokes for engaging under the doughnuts and lifting them out of the liquor, and guide and delivery chute bars interlapping with the spokes and curving up from the liquor around and above the spider axis, and thence sloping downward over the edge of the receptacle, so as to coact with the spider in the ejection of the doughnuts.

JOHN C. BERGNER.